United States Patent
Prieto et al.

(10) Patent No.: US 9,777,548 B2
(45) Date of Patent: Oct. 3, 2017

(54) CONFORMABLE DEVICES USING SHAPE MEMORY ALLOYS FOR DOWNHOLE APPLICATIONS

(71) Applicants: Carlos A. Prieto, Katy, TX (US); Bennett M. Richard, Kingwood, TX (US)

(72) Inventors: Carlos A. Prieto, Katy, TX (US); Bennett M. Richard, Kingwood, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 290 days.

(21) Appl. No.: 14/138,723

(22) Filed: Dec. 23, 2013

(65) Prior Publication Data

US 2015/0176362 A1    Jun. 25, 2015

(51) Int. Cl.
  *E21B 33/12* (2006.01)
  *E21B 23/06* (2006.01)
  *E21B 43/10* (2006.01)
  *F03G 7/06* (2006.01)

(52) U.S. Cl.
  CPC .......... *E21B 33/1208* (2013.01); *E21B 23/06* (2013.01); *E21B 43/108* (2013.01); *F03G 7/065* (2013.01)

(58) Field of Classification Search
  CPC .... E21B 33/128; E21B 33/124; E21B 43/108; E21B 23/006; E21B 36/04; F03G 7/065
  See application file for complete search history.

(56) References Cited

U.S. PATENT DOCUMENTS

| | | | |
|---|---|---|---|
| 4,515,213 A * | 5/1985 | Rogen | E21B 33/1212 166/123 |
| 4,619,320 A * | 10/1986 | Adnyana | E21B 34/06 166/66.7 |
| 7,013,979 B2 | 3/2006 | Richard | |
| 7,318,481 B2 | 1/2008 | Richard | |
| 7,708,073 B2 * | 5/2010 | Richard | E21B 36/008 166/228 |
| 7,926,565 B2 * | 4/2011 | Duan | E21B 43/082 166/278 |
| 8,365,833 B2 * | 2/2013 | Carrejo | E21B 41/00 166/381 |
| 8,763,687 B2 * | 7/2014 | Ingram | E21B 33/1208 166/187 |
| 9,068,437 B2 * | 6/2015 | Carrejo | E21B 43/08 |
| 2002/0157831 A1 | 10/2002 | Kurlenya et al. | |

(Continued)

OTHER PUBLICATIONS

PCT International Search Report and Written Opinion; International Application No. PCT/US2014/066519; International Filing Date: Nov. 20, 2014; Date of Mailing: Feb. 26, 2015; pp. 1-12.

*Primary Examiner* — Jennifer H Gay
(74) *Attorney, Agent, or Firm* — Cantor Colburn LLP

(57) ABSTRACT

An apparatus for use in wellbore includes a device having a shape conforming member that includes a shape memory alloy that has been compressed from a first expanded shape to a second compressed shape. The apparatus further includes a device for supplying electrical energy to the shape memory alloy downhole to transform the shape memory alloy from the second shape to or near the first shape.

14 Claims, 3 Drawing Sheets

(56) References Cited

U.S. PATENT DOCUMENTS

| | | | |
|---|---|---|---|
| 2004/0194970 A1* | 10/2004 | Eatwell | E21B 33/1208 166/387 |
| 2005/0205263 A1* | 9/2005 | Richard | E21B 43/086 166/369 |
| 2008/0264647 A1 | 10/2008 | Li | |
| 2008/0296020 A1 | 12/2008 | Willauer | |
| 2009/0071717 A1* | 3/2009 | Gissler | G01B 7/003 175/45 |
| 2009/0084539 A1* | 4/2009 | Duan | C08G 18/44 166/187 |
| 2009/0223678 A1* | 9/2009 | Richard | E21B 36/008 166/382 |
| 2010/0078173 A1 | 4/2010 | Buytaert et al. | |
| 2010/0089565 A1* | 4/2010 | Duan | E21B 43/082 166/51 |
| 2010/0288501 A1* | 11/2010 | Fielder | E21B 43/128 166/311 |
| 2011/0036565 A1* | 2/2011 | Holderman | E21B 43/103 166/227 |
| 2011/0073296 A1* | 3/2011 | Richard | E21B 43/082 166/56 |
| 2011/0232901 A1* | 9/2011 | Carrejo | E21B 41/00 166/227 |
| 2012/0055667 A1* | 3/2012 | Ingram | E21B 33/1208 166/65.1 |
| 2012/0090830 A1 | 4/2012 | O'Malley et al. | |
| 2012/0186819 A1* | 7/2012 | Dagenais | E21B 43/08 166/310 |
| 2012/0211223 A1* | 8/2012 | Guest | B21F 27/18 166/228 |
| 2013/0153246 A1* | 6/2013 | Carrejo | E21B 43/08 166/381 |
| 2013/0162056 A1* | 6/2013 | Pinto, IV | H01H 83/10 307/326 |
| 2013/0256991 A1 | 10/2013 | Ramon et al. | |
| 2013/0292117 A1* | 11/2013 | Robisson | E21B 43/103 166/278 |
| 2014/0027108 A1* | 1/2014 | Lopez | E21B 43/108 166/248 |
| 2014/0041858 A1* | 2/2014 | Sun | E21B 33/12 166/179 |
| 2014/0048279 A1* | 2/2014 | Holderman | E21B 43/08 166/369 |
| 2014/0158426 A1* | 6/2014 | Hay | E21B 4/02 175/17 |
| 2015/0176362 A1* | 6/2015 | Prieto | E21B 33/1208 166/302 |

\* cited by examiner

CONFORMABLE DEVICES USING SHAPE MEMORY ALLOYS FOR DOWNHOLE APPLICATIONS

BACKGROUND

1. Field of the Disclosure

This disclosure relates generally to apparatus and method for completing wellbores that utilize one or more shape conformable devices or members containing shape memory alloys, including, but not limited to, packers, sand screens, seals and inflow control devices.

2. Background of the Art

Wellbores are drilled in subsurface formations for the production of hydrocarbons (oil and gas). Wells often extend to depths of more than 15,000 feet and have downhole temperatures exceeding 300° F. After a wellbore is formed, a production string is installed therein for efficient production of the hydrocarbons from subsurface formations. The production string may be installed in an open hole or a cased hole and typically includes a tubing that extends from the surface to the wellbore depth. A variety of devices are placed inside and around the tubing for efficient production of hydrocarbons from the subsurface formations. Some of these devices may utilize materials or members that expand when heated. Such materials are generally referred to herein as "conformable materials" "shape memory materials", or "swellable materials" and the devices that utilize such materials as "conformable devices." Such devices are installed on the production string in their unexpanded or compressed state or form and expanded to their expandable state by heating such devices in the wellbore. Conformable devices include, but are not limited to, packers, sand screens, seals and certain flow control devices. Shape memory materials or swellable materials that contain non-metallic materials, such as polymers, have been utilized for making shape conformable devices and members. A polymer shape memory material has a glass transition temperature and when such a material is heated to or above such temperature, it expands. The expanded material is then compressed at this elevated temperature to a desired compressed shape for use in a wellbore while the temperature is at or above its glass transition temperature. The compressed shape memory material retains its shape when its temperature is reduced below the glass transition temperature. When reheated to or above its glass transition temperature, the member expands to its original expanded shape and retains the original expanded until compressed at or above the glass transition temperature.

To form a member from a polymer shape memory material, the material is heated from an ambient temperature to a temperature at or above its glass transition temperature and shaped or formed into a neutral shape or desired expanded shape. The neutral shape is the desired shape after deployment of such member at a suitable location, such as in a wellbore. It is then compressed at a temperature at or above its glass transition temperature to a compressed shape or an intermediate shape and then cooled to a temperature below the transition temperature to cause the shape memory member to retain the intermediate shape. The intermediate shape is the desired shape suitable for running the device into a wellbore. The device is then placed in the wellbore and, heated in the wellbore to or above the glass transition temperature to cause it to expand, thus deploying it in the wellbore. Such a process is relatively cumbersome and requires controlled heat chambers and facilities to mold the polymers at high temperatures to their intermediate or compressed shapes. In addition, polymer shape memory materials have lower operating temperatures and lower mechanical strength compared to alloys. Furthermore, polymer shape memory materials have low thermal conductivity and thus require a relatively long time to expand to their neutral or expanded shape after they are heated.

The disclosure herein provides shape conforming devices that contain one or more shape memory alloys and methods of deployment of such devices.

SUMMARY

In one aspect, an apparatus for use in wellbore is disclosed that in one non-limiting embodiment includes a device having a shape-conforming member that includes a shape memory alloy that has been compressed at an ambient temperature from an expanded shape to a compressed shape and a device for supplying electrical energy to the shape memory alloy downhole to transform the shape memory alloy from the compressed shape to or near the expanded shape.

In another aspect, a method of deploying a shape-conforming device in a wellbore is disclosed that in one non-limiting embodiment includes: forming the device using a shape memory alloy to attain a first or expanded shape; compressing the shape memory alloy from the first shape to a second or compressed shape; heating the shape memory alloy to transform the shape memory alloy from the second shape to the first shape or near the first shape by one of: supplying an electrical energy to the shape memory alloy; supplying heat by a heating element that heats the environment proximate to the shape memory alloy; and supplying a hot fluid to the shape memory alloy.

Examples of the more important features of devices or members containing a shape memory alloy for use in wellbores have been summarized rather broadly in order that the detailed description thereof that follows may be better understood, and in order that the contributions to the art may be appreciated. There are, of course, additional features that will be described hereinafter and which will form the subject of the claims.

BRIEF DESCRIPTION OF THE DRAWINGS

For a detailed understanding of the apparatus and methods disclosed herein, reference should be made to the accompanying drawings and the detailed description thereof, wherein like elements have generally been given like numerals and wherein.

DESCRIPTION OF EXEMPLARY EMBODIMENTS

A shape-memory alloy ("SMA"), also referred to as a smart metal, memory metal, memory alloy and smart alloy, is an alloy that "remembers" its original or neutral, cold-forged shape. If the SMA is deformed from the original shape, it returns to the original shape when heated to its transition temperature. A downhole component or device, such as sand screen, may be formed to attain a neutral shape. Such a device may then be compressed to a shape suitable for running into a wellbore. The device may then be run in or conveyed into the wellbore in the compressed shape The SMA may is then be heated in the wellbore to its transition temperature to transform it from the compressed shape to the neutral or original shape. An advantage of using an SMA is its high operating temperature, which can be substantially higher than the temperature in high temperature/high pressure wellbores. As an example, some SMAS have transition temperatures up to ~600° C. In addition, SMAS are electrically conductive and thus may be heated in wellbores by supplying electrical energy to the SMAS in the wellbore.

Figure 1:
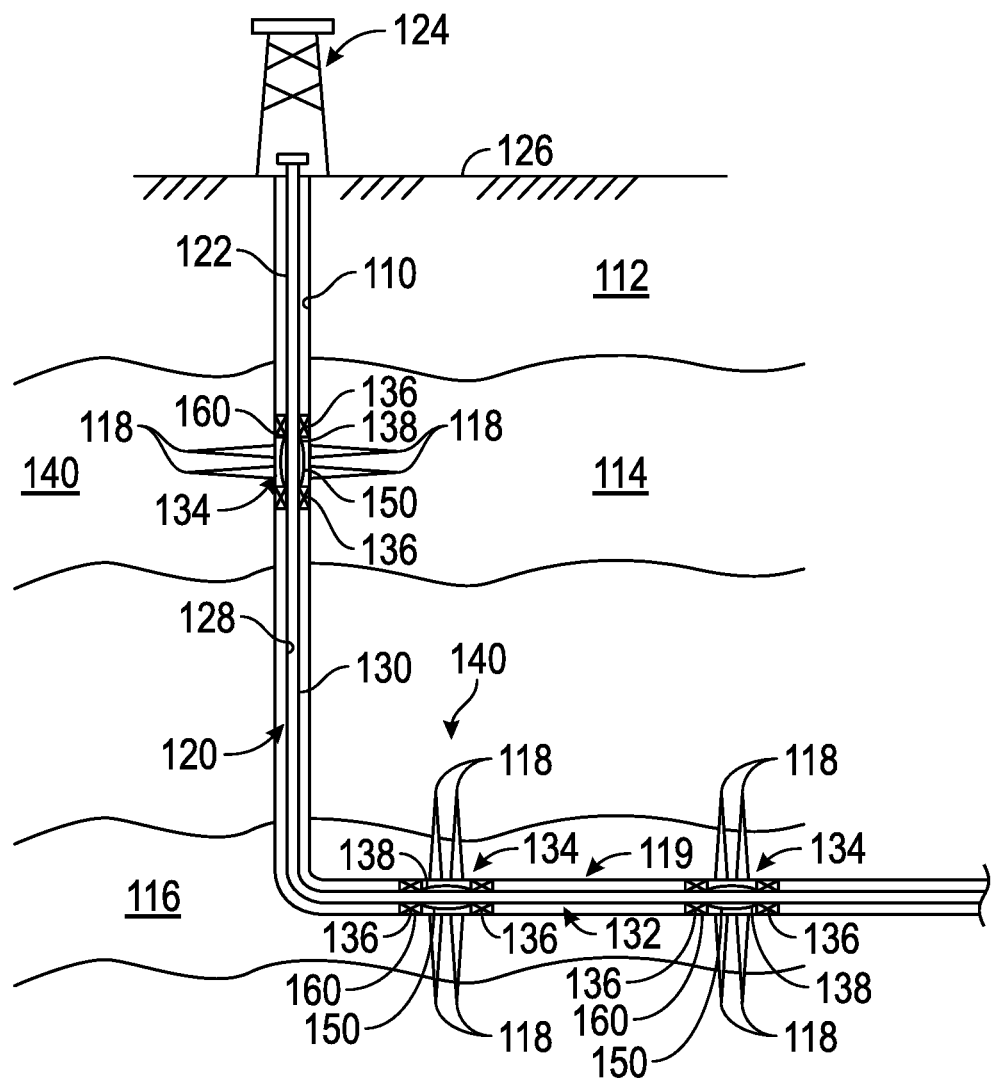
FIG. 1 is a schematic diagram of an exemplary wellbore system that includes an exemplary multi-zone wellbore production string deployed in a wellbore, which production string includes one or more shape conforming devices that include a shape memory alloy and made according to one or more non-limiting embodiments of the disclosure.

FIG. 1 shows an exemplary wellbore 110 that has been drilled through the earth formation 112 and into a pair of production formations or reservoirs 114, 116 from which it is desired to produce hydrocarbons. The wellbore 110 is a cased wellbore, lined with metal casing. A number of perforations 118 penetrate and extend into the formations 114, 116 so that production fluids 140 may flow from the formations 114, 116 into the wellbore 110. The wellbore 110 has a deviated or substantially horizontal leg 119. The wellbore 110 has a production string or assembly, generally indicated at 120, disposed therein by a tubing 122 that extends downwardly from a wellhead 124 at the surface 126. The production assembly 120 defines an internal axial flow bore 128 along its length. An annulus 130 is defined between the production assembly 120 and the wellbore casing. The production assembly 120 has a deviated, generally horizontal portion 132 that extends along the deviated leg 119 of the wellbore 110. Several production zones 134 are positioned at selected locations along the production assembly 120. Each production zone 134 may be isolated within the wellbore 110 by a pair of packer devices 136. Although only three production zones 134 are shown in FIG. 1, there may, in fact, be a large number of such zones arranged in serial fashion along the horizontal portion 132.

Each production zone may 134 may include a flow control or production flow control device 138 to govern one or more aspects of flow of one or more fluids into the production assembly 120. As used herein, the term "fluid" or "fluids" includes liquids, gases, hydrocarbons, multi-phase fluids, mixtures of two of more fluids, water, brine, engineered fluids such as drilling mud, fluids injected from the surface such as water, and naturally occurring fluids such as oil and gas. In accordance with embodiments of the present disclosure, the production control device 138 may include a number of alternative constructions of sand screens 150 and inflow control devices 160 that inhibit the flow of solids above a certain or selected size from the formations 114 and 116 into the string 120. One or more devices, including but not limited to, packers 136, seals and production control devices 138, may include members made from a shape memory alloy. Forming an exemplary device utilizing a shape memory alloy and deploying such a device in a wellbore is described in reference to FIGS. 2 and 3.

Figure 2C:
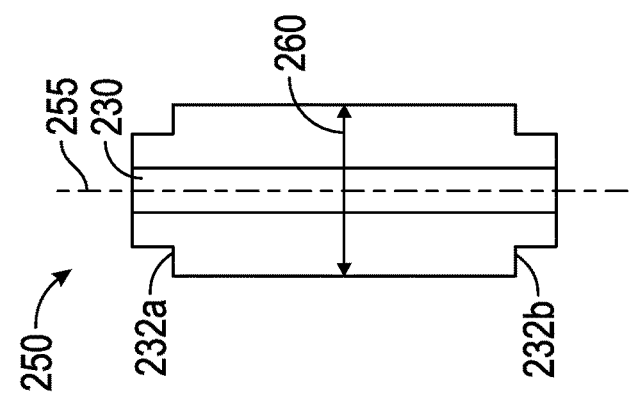
FIGS. 2A-2C show a method of making a conformable member using a shape memory alloy for use in a wellbore, according to one non-limiting embodiment.
Figure 2B:
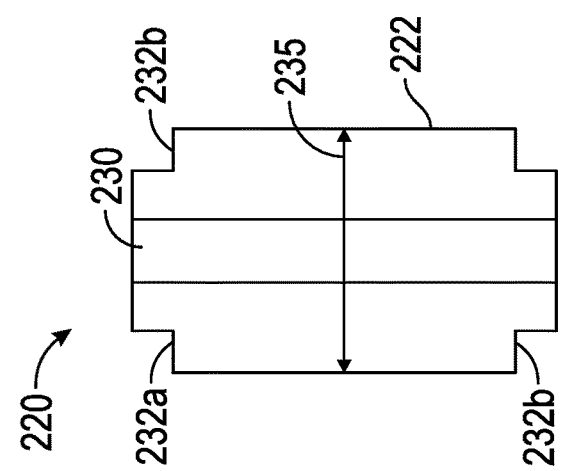
Figure 2A:
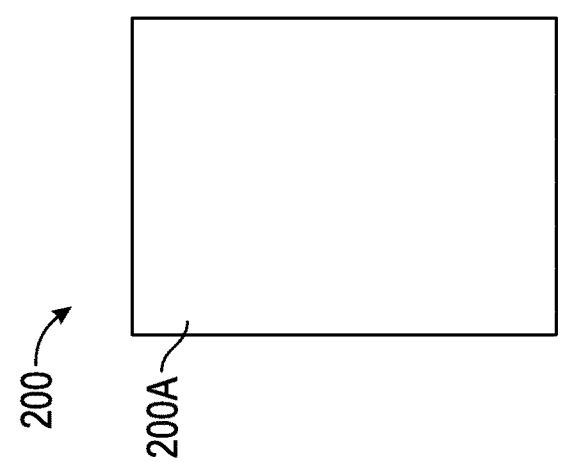

FIGS. 2A-2C show a method of making a shape memory alloy member (also referred to herein as a conformable member) for use in an apparatus, such as a sand screen, packer or seal for use in wellbores, according to one non-limiting embodiment of the disclosure. FIG. 2A shows a shape memory alloy material 200 having an initial shape 200a. Shape 200a may then be machined into a desired neutral shape or the original shape 220, i.e., the shape that is eventually desired for the member to attain in its intended application, such as in a wellbore, as shown in FIG. 2B. In the particular embodiment of FIG. 2B the original shape 220 is shaped for use as a sand screen. The original shape 220 substantially forms a cylindrical member 222 having a bore 230 therethrough so that the cylindrical member 222 may be placed around a tubing, such as production tubing, as described in more detail in reference to FIG. 3. The member 222 is shown to include recessed edges 232a and 232b on opposite ends of the member 222. The member 222 then may be cold-forged to a compressed shape 250. In one embodiment, the member 222 is compressed along the sides 222a and 222b to attain the compressed shape 250, with the edges retaining their original shape and size. Shape 250 is shown compressed along the vertical axis 255 to a diameter 260 that is smaller than the diameter 235 of original shape 220. The edges 232a-232d and the through bore remain in their original shapes, as shown in shape 220. The compressed shape 250 is configured so that the member in compressed shape 250 may be placed around a tubing and run in the wellbore before it is heated and expanded (deployed) in the wellbore to attain the original shape 220. In aspects, the shape memory alloy utilized herein has an open cell structure, with sufficient permeability to allow flow of the hydrocarbons therethrough and inhibit or prevent the flow of solid particles above a certain size (such as sand from the formation) from flowing therethrough. In general the SMA utilized may have a foam-like permeable structure. Such materials are commercially available. Alternatively, granular materials, such as beads, made of any suitable material may be added to cause a shape memory alloy to act as an open cell structure to provide the filtering and permeability properties desired for a sand screen.

Figure 3:
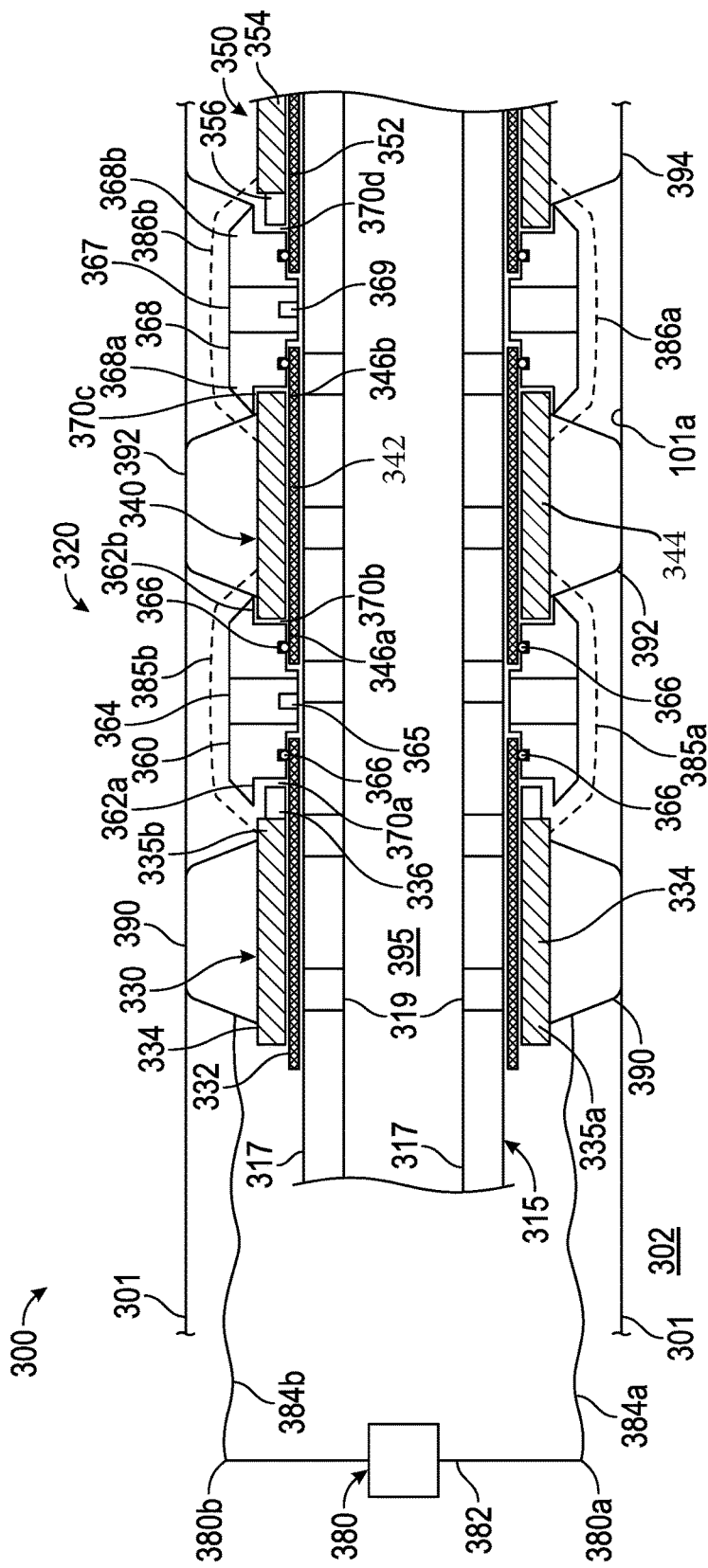
FIG. 3 shows an exemplary shape memory device placed in a wellbore along with a heat source for deployment of the device in the wellbore, according to one non-limiting embodiment of the disclosure.

FIG. 3 shows a wellbore system 300 with a production string having a downhole device made using a shape memory alloy, according to one non-limiting embodiment of the disclosure. Wellbore system 300 is shown to include a wellbore 301 formed in a formation 302. A production string 315 containing a production tubing 317 is deployed in the wellbore for the production of fluids from the formation 302 into the production tubing 317 via fluid passages or perforation 319 in the production tubing 317. The downhole device 320 is shown placed on the outside of the perforations 319. In the embodiment shown in FIG. 3, the downhole device 320 is a sand screen. However, a device made according to this disclosure is not limited to sand screens and may be configured to perform other function, including, but not limited to, packers and seals. In one aspect the device 320 may include one or more sections or modules that include a suitable shape SMA. As an example, FIG. 3 shows three sections, 330, 340 and 350 serially connected and placed around the tubing 317. Section 330 is shown to include an insulator 332 paced on the tubing 317 and a sand screen SMA member 334 on the outside of the insulator 332. The SMA member 334 has a shaped edge 336, similar to the edge 232a or 232b shown in FIG. 2C. Section 340 includes an insulator 342 on the tubing 317 that is surrounded by an SMA member 344 having shaped edges 346a and 346b. Similarly, section 350 includes an insulator 352 around the tubing 317 surrounded by SMA member 354 having a shaped edge 356. A connector 360 serially or axially connects sections 330 and 340 together and secures them to the tubing 317. Similarly, a connector 368 connects SMA members 340 and 350 together and secures them to the tubing 317. In one non-limiting embodiment, connector 360 includes a first end 362a that sits on the shaped edge 336 of SMA member 330 and a second edge 362b that sits on the shaped edge 346a of SMA member 340. The connector 360 includes an access or opening 364 through which a connection member, such as a screw 365, may be used to attach the connector 360 to the tubing 317. Similarly, a connector 368 axially connects SMA members 340 and 350 at shaped ends 346b and 356, and a connector element 369 secures the connector 368 to the tubing 317 through an opening 367. An insulator 370a is placed between the shaped end 336 and the inside of the connector end 362a to electrically insulate SMA member 330 from the connector 360. Insulator 370b is placed between shaped end 346a of SMA member 340 and inside of the connector end 362b to electrically insulate SMA member 340 from connector 368. Similarly, insulator 370c is be placed between the shaped end 346b of SMA member 340 and inside edge of connector end 368a to electrically insulate SMA member 340 from connector 368. Similarly, insulator 370d is placed between shaped end 356 of SMA member 350 and inside of the connector end 368b to electrically insulate SMA member 350 from connector 368. The combination of the insulators 332, 342, 352, 370a, 370b, 370c and 370d electrically insulates SMA members 330, 334 and 350 from all metallic members in the system 300. O-rings 366 are provided between the connectors and the production tubing 317 for assembly of the connectors on the production tubing 317.

As noted earlier, the device 320 is run in the wellbore in its run-in or compressed shape, as shown in FIG. 3. To deploy the device 320 it the wellbore, the SMA members 330, 340 and 350 are heated to or above the transition temperature of the SMA material, which depends upon the composition of such material. In general, the transition temperature is relatively high compared to the temperature in the wellbore and/or the formation. Since SMAS are electrically conductive materials, electrical energy (current) may be supplied to the SMAS in device 320 to heat such SMAS to or above their transition temperature to cause them to expand to their neutral or original shape. In one non-limiting embodiment, electrical energy may be supplied by a circuit 380. In one configuration, the circuit 380 includes a power source 382, which may be an AC source or a DC source at the surface or in the wellbore, or a set of batteries proximate to the device 320 in the wellbore. In one aspect, the various sections, such as 330, 340 and 350 may be electrically connected in series or in parallel. FIG. 3 shows one end 380a of the power source 380 connected to one end 335a of the SMA 334 via a conductor 384a and the other end 380b of the power source 380 connected to the other end 335b of the SMA 334 via a conductor 384b to complete the electric circuit between the power source 380 and the SMA 334. Conductors 385a and 385b may be utilized to connect source 380 to SMA 344 and conductors 386a and 386b to connect to SMA member 354. The SMAS may also be connected in parallel by separate conductors run from the power source 380 to each of the SMAS.

To deploy the device 320 in the wellbore, the device 320 is surrounded by a dielectric fluid 395 and then electrical energy is supplied to each of the SMAS 334, 344 and 354 in the device 320 to cause the SMAS to expand to their original or neutral shape. Dotted lines 390 show the SMA member 334 in its expanded shape, wherein it presses against the inside 101a of the wellbore 101. Similarly dotted lines 392 and 394 respectively show SMA members 344 and 354 in their expanded shapes pressing against the wellbore inside 101a.

Thus, in various aspects, shape memory alloys that are electrically conductive and can operate at temperatures well above the highest temperature in wellbores may be utilized in downhole applications. The device may be conveyed into a wellbore in a compressed shape and subsequently heated to its transition temperature by supplying electrical energy to the shape memory alloy to deploy it in its original or neutral shape. Such devices can operate at higher wellbore temperatures than devices using polymer shape memory materials. Additionally, shape memory alloys are high strength materials and therefore provide a higher pressure against the formation and maintain that stress over a long period of time and thus can be more reliable than polymer shape memory materials.

In aspects, a device for use in a wellbore may be made of: nonconductive standoff mesh, nonconductive rings or connectors, metal base pipe, SMA cartridges and electric cables connecting in series or in parallel each SMA cartridge. To prevent the tool from grounding while current is circulating through the SMA material, the SMA members are insulated from metallic members and a dielectric fluid may be used to electrically isolate the SMA members from other conductive elements in the wellbore, which causes the electric current to flow only through the SMA members and the conductors. Any suitable dielectric fluid may be utilized for the purpose of this disclosure, including, but not limited to, oils used electrical submersible motors known in the art, which oils typically have about 30 KV dielectric breakdown voltage per 0.25 centimeter. Should the deployment be desired in a conductive fluid in the wellbore, a heater may be run in the wellbore inside the base pipe to heat the fluid in the pipe to a temperature above the transition temperature of the SMA material. Such heaters may be incorporated as part of the downhole device.

The foregoing disclosure is directed to the certain exemplary embodiments and methods. Various modifications will be apparent to those skilled in the art. It is intended that all such modifications within the scope of the appended claims be embraced by the foregoing disclosure. The words "comprising" and "comprises" as used in the claims are to be interpreted to mean "including but not limited to". Also, the abstract is not to be used to limit the scope of the claims.

The invention claimed is:

1. An apparatus for use in wellbore, comprising:
a device including a shape memory alloy (SMA) that is electrically conductive and has a first shape, wherein the SMA has a permeable foam structure that when heated to or above a transition temperature will attain a second shape wherein the device includes:
a base pipe having a fluid flow passage;
a first insulator disposed outside around the base pipe;
a shape memory member including a first member and a second member made of the SMA wherein the at least one of first member and the second member is disposed outside around the first insulator, wherein the SMA allows a first flow to permeate through an open-cell structure and prevents a second flow to permeate through the open-cell structure; and
a connector that connects the first member and the second member to the base pipe;
a second insulator that electrically insulates the at least one of the first member and the second member from the connector; and
an electric energy source configured to supply electric energy to the SMA to cause the SMA to heat to or above the transition temperature to attain the second shape.

2. The apparatus of claim 1, wherein the device is a sand screen.

3. The apparatus of claim 1, wherein at least one conductor connects the electric energy source to the first member and the second member in a manner that causes current to circulate through the first member and the second member.

4. The apparatus of claim 1 further comprising a dielectric fluid surrounding the SMA for providing electrical insulation between the SMA and the wellbore.

5. The apparatus of claim 1, wherein the electric energy source is selected from a group consisting of: an AC source; a DC source; and a battery.

6. The apparatus of claim 5 further comprising a device that triggers the electric energy source and wherein the device is selected from a group consisting of: a timer downhole; and a wireless device that sends a signal to a receiver associated with the electric energy source downhole.

7. A method of deploying an apparatus in a wellbore, comprising:
providing a device that includes a shape memory alloy member having a permeable form structure configured to expand from a first compressed shape to second expanded shape when heated to or above a transition temperature wherein the device includes:
a base pipe having a fluid flow passage;
a first insulator disposed outside around the base pipe;
wherein the shape memory alloy member includes a first member and a second member disposed outside around the first insulator, wherein the shape memory alloy member allows a first flow to permeate through an open-cell structure and prevents a second flow to permeate through the open-cell structure;
a connector that connects the first member and the second member to the base pipe;
a second insulator that electrically insulates the at least one of the first member and the second member from the connector;
placing the device with the shape memory alloy member in the wellbore in the first compressed shape; and
heating the shape memory alloy member in the wellbore to or above the transition temperature to transform the shape memory from the first compressed shape to the second expanded shape.

8. The method of claim 7 further comprising supplying electric energy to the shape memory alloy member to heat the shape memory alloy member to transform the SMA from the first shape to the second shape.

9. The method of claim 8 further comprising placing the shape memory alloy in a dielectric material before supplying the electrical energy to the shape memory alloy member.

10. The method of claim 7, wherein heating the shape memory alloy member comprises one of: (i) supplying a hot fluid into the wellbore to heat the shape memory alloy member; and (ii) conveying a heater proximate to the shape memory alloy member and activating the heater to heat the shape memory alloy member.

11. The method of claim 7, wherein providing the device that includes the shape memory alloy member comprises forming the shape memory alloy member by:
forming a shape memory alloy material into a first shape; and cold-forging the first shape into the second shape.

12. A wellbore system, comprising:
a device that includes at least one SMA member wherein the device includes:
a base pipe having a fluid flow passage;
a first insulator disposed outside around the base pipe;
wherein the at least one SMA member has a permeable foam structure, and includes a first member and a second member disposed outside around the first insulator, wherein the at least one SMA member allows a first flow to permeate through an open-cell structure and prevents a second flow to permeate through the open-cell structure; and
a connector that connects the first member and the second member to the base pipe;
a second insulator that electrically insulates the at least one of the first member and the second member from the connector; and
a heat source configured to heat the at least one SMA member in the wellbore to cause the at least one SMA member to expand from a first shape to a second shape.

13. The wellbore system of claim 12:
wherein the heat source is selected from a group consisting of: an AC source at the surface; an AC source in the wellbore; a DC source at the surface; a DC source in the wellbore; and a battery in the wellbore.

14. A method of deploying a shape conforming device in a wellbore, comprising:
forming the device using a shape memory alloy to attain a first shape wherein the device includes:
a base pipe having a fluid flow passage,
a first insulator disposed outside around the base pipe,
wherein the shape memory alloy has a permeable foam structure and includes a first member and a second member disposed outside around the first insulator, wherein the shape memory alloy allows a first flow to permeate through an open-cell structure and prevents a second flow to permeate through the open-cell structure,
a connector that connects the first member and the second member to the base pipe, and
a second insulator that electrically insulates the at least one of the first member and the second member from the connector;
compressing the shape memory alloy from the first shape to a second shape; and
heating the shape memory alloy to transform the shape memory alloy from the second shape to the first shape or near the first shape by supplying electrical energy to the shape memory alloy.

* * * * *